Patented Sept. 14, 1954

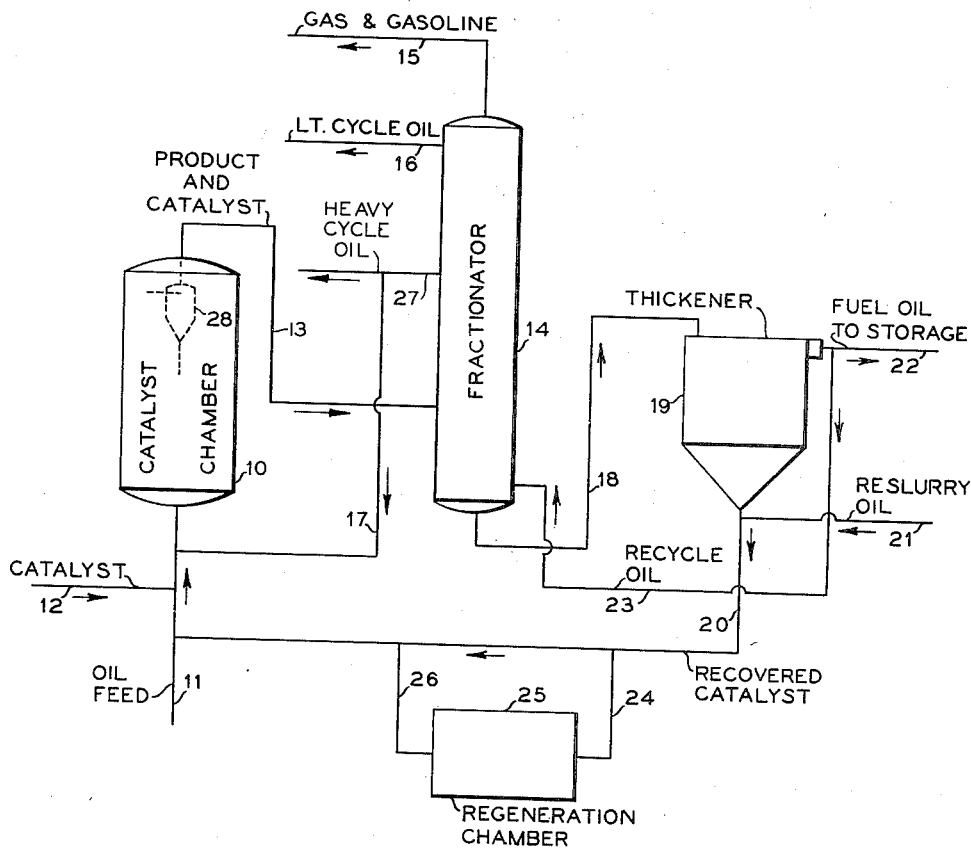

2,689,209

UNITED STATES PATENT OFFICE 2,689,209

CATALYTIC TREATMENT OF HYDROCARBONS

Allen H. Blair, Sweeny, Tex., assignor to Phillips Petroleum Company, a corporation of Delaware Application December 27, 1949, Serial No. 135,163

5 Claims. (Cl. 196—52)

This invention relates to an improved catalyst handling process. In one of its more specific aspects it relates to a process for recovering catalyst from a catalytic reaction and returning same to the reaction. One preferred embodiment of my invention relates to separating and recovering particulate catalyst used in a fluidized catalytic cracking process from the product residue.

In the treatment of hydrocarbons by catalytic cracking there are two general classes of treatment: moving bed such as fluidized and Thermofor processes or fixed bed processes. It is with the former type of treatment that this invention deals.

Broadly, a fluidized catalyst process is one in which the catalyst is used in a particulate form such as granules or powder and is supported in a turbulent dense phase by the material being treated whether it be a vapor or a liquid. In almost any process of this type a certain amount of catalyst is carried overhead with the effluent materials in spite of the fact that suitable separating apparatus such as cyclone separators and the like are employed. Some further means of catalyst recovery must therefore be utilized to prevent clogging of lines, fractionators, and other processing equipment through which the cracked materials are passed. In product separating equipment such as fractionators and the like, the catalyst carried thereto in the cracking effluent accumulates in the oil residuum or bottoms fraction and must be removed therefrom. There are several difficulties encountered in this procedure, one of which is the necessity of using a rather large quantity of the cracked oil as a carrier for the catalyst. This is particularly disadvantageous when it is desirable to recover most of the oil fractions for further treatment or use. It is conceivable that sufficient oil could be used to carry the catalyst from the fractionation equipment to catalyst recovery means; however, such a procedure would either result in too great a quantity of the oil going to fuel oil or would necessitate an additional fractionation step to separate the desirable fractions from the residuum.

The separated catalyst which for economic reasons must be returned to the catalytic cracking process may be carried back to the reaction chamber with a portion of the bottoms product from the fractionator. However, this oil is known to be particularly refractory when recycled to the reaction chamber and thus either takes up space or must be treated under more severe conditions. If the latter procedure is chosen it will result in excessive cracking of the fresh feed to light materials such as $C_4$ and lighter, and this also is undesirable.

It is an object of this invention to provide an improved process for handling the catalyst in fluidized catalyst processes.

Another object of this invention is to provide a process for separating a fluidizable catalyst from the products obtained by the use thereof.

Another object of this invention is to provide an improved process for recycling a fluidizable catalyst without introducing a refractory oil fraction from said catalyst treatment back to said treatment.

Another object is to provide an improved catalytic cracking process.

Another object of this invention is to provide an improved process whereby a maximum quantity of product may be recovered from a fluidized catalytic cracking process.

Another object of this invention is to provide an improved catalytic cracking process wherein the production of fuel oil is reduced.

Still other objects and advantages of this invention will be apparent to one skilled in the art from the accompanying disclosure and discussion.

I have discovered a process whereby the entrained fluidized catalyst from a cracking process may be advantageously separated from the products thereof without the necessity of recycling much of the refractory bottoms product back to the catalyst reaction with the catalyst and without causing excessive concentrations of catalyst in the separation apparatus.

In accordance with my invention the product from a fluidized bed catalytic cracking process and the entrained powdered catalyst are passed to a separator such as a fractionation column or like equipment where the valuable constituents are passed overhead. The character of these materials will depend on the type of feed to the catalytic cracking process and also on the catalyst used and the severity of the treatment. The bottoms product is generally of low quality and in some cases may be used for fuel oil and the like. In addition it is usually quite refractory in nature and often cannot be further treated except under quite harsh conditions. This oil and the catalyst which is entrained therewith is passed to a thickening apparatus such as a Dorr thickener or the like for separation of the catalyst from the oil. Such apparatus is operated to provide only sufficient oil in the catalyst to make it flow from the thickener. By so operating an absolute minimum of the refractory oil is returned to the catalyst chamber with the recycled catalyst. This is a particular advantage of my invention inasmuch as it is not desirable to mix any more of the refractory oil than necessary with a less refractory feed. The slurry of catalyst from the thickener is mixed with a stream of reslurry oil which is generally fresh feed and is carried back to the reaction zone. Other modes of carrying the catalyst back to the catalyst chamber such as light cycle oil, gas, or steam may be used. If the recycle catalyst is introduced directly to the catalyst chamber, the material carrying same should be of such a nature as to not provide any ill effects on the reaction. It is within the scope of my invention to pass all or only a portion of the catalyst to a regeneration zone where its activity is renewed by conventional means such as burning off the carbon. The clarified oil, i. e. refractory bottoms fraction, is recovered from the top of the thickener and is passed to suitable storage facilities or may be used in any manner desired. A portion of this oil however is recycled to the bottom of the fractionator so as to provide sufficient oil to carry the catalyst therefrom to the thickener. This is another advantage of my process since it provides continuous removal of the catalyst from the fractionator thus avoiding a buildup of catalyst therein and necessitating a shutdown. Another alternative which might be practiced but which my invention circumvents is to lower the initial boiling point of the bottoms product thus providing additional oil for removing the catalyst. It is obvious that this may be highly uneconomical as discussed above when it is desired to get all the usable oil possible. It would make necessary loss of valuable gas oil to fuel oil or would necessitate further fractionation of the clarified oil. Either proposition would be costly and would greatly reduce the economy of the whole process.

For a more detailed understanding of the process of my invention refer now to the attached drawing, which is a schematic flow diagram, in conjunction with the following discussion. Suitable valves, pumps, and other conventional equipment known to those skilled in the art have been omitted from the drawing for simplicity's sake. The reactants and their proportions and other specific ingredients are presented as being typical and should not be construed to limit the invention unduly. This discussion will also serve to exemplify my invention.

Refer now to the drawing. A feed stream such as a paraffinic virgin gas oil or hydrogenolysis product gas oil, or like materials generally boiling in the range of 400 to 750° F. and higher is charged through line 11 to catalyst chamber 10 which has a capacity of 20,000 to 25,000 barrels a day. A suitable cracking catalyst such as bauxite, alumina, acid treated kaolin, fuller's earth, diatomaceous earth, acid treated bentonitic clays, synthetic silica-alumina gels, silica gel, alumina gel, and the like which are adapted to fluidization may be used either by itself or in admixture and/or containing promoters, is introduced to the catalyst chamber in a finely divided form through lines 12 and 11. Suitable space velocities which may be used in the practice of this process may be in the range of 0.75 to 0.80 ton of oil per ton of catalyst per hour, however space velocities outside this range may also be used. The selection of space velocity depends on several factors such as refractoriness of the feed, degree of cracking per pass, and desired character of the products. It is therefore well within the skill of the art to select the space velocity best adapted to the process to be used. Likewise it is within the skill of the art also to select the catalyst to oil ratio, however, I generally prefer to use a ratio in the range of 7.0 to 7.5 on a weight basis. The oil which has been vaporized previous to introduction to the reaction chambers containing the catalyst from line 12 is cracked in zone 10. Suitable cracking temperatures are in the range of 600 to 1200° F., however it is often preferred to operate in a range of, say, 900 to 975° F., particularly when the feed stock is a virgin paraffinic gas oil. Suitable reaction pressures which may be used are in the range of, say, atmospheric to 50 or 100 p. s. i. g. and as will allow the oil to remain in the vapor state.

The effluent from catalyst chamber 10 is withdrawn through cyclone separator 26 which separates a major portion of the catalyst from the effluent and returns it to the catalyst chamber. It is impossible to remove all of the catalyst from the effluent vapors, even with such apparatus as cyclone separators, and so a portion of it, entrained with the vapors, is carried via line 13 to fractionator 14. In this fractionator the cracked product is cut into the desired fractions. For example when a virgin paraffinic gas oil, boiling in the range of 400 to 750° F. is charged at the rate of 10,000 to 15,000 barrels per day, 30,000 to 40,000 lbs./hour of $C_4$ and lighter gases may be produced along with 5,000 to 7,000 bbl./day of butane-free gasoline, 4,000 to 6,000 bbl./day of light cycle oil boiling in the range of 400 to 650° F., 5,000 to 7,000 bbl./day of heavy cycle oil boiling in the range of 500 to 750° F., and 500 to 1000 bbl./day of bottoms or residuum. It is generally preferred to operate the fractionator such that the catalyst concentration of the residuum withdrawn is below ½ lb. per gallon. Although this is a typical product distribution, I do not intend to limit my invention by it since it is within the scope of my invention to use feed stock which would provide different products or to use conversion conditions which would provide different product distributions.

It is of course within the scope of my invention to withdraw a portion of the catalyst from chamber 10 in a conventional manner and regenerating same, either intermittently or continuously.

The gas ($C_4$ and lighter) and gasoline are recovered overhead by line 15 and are passed to suitable recovery apparatus not shown. The light cycle oil which may be used in the production of diesel fuel, heating oils, or the like is withdrawn via line 16. Heavy cycle oil which may be recovered for use in lubricating oil and the like may be recovered via line 27, or may be recycled to the cracking chamber via lines 27, 17, and 11. Bottoms in an amount of 1000 to 1800 bbl./day including catalyst and recycled clarified slurry oil described hereinafter are withdrawn from the bottom of fractionator 14 via line 18 and are passed to thickener 19 which may be of the type manufactured by the Dorr Company or other suitable thickening device. In the thickener the oil is clarified by the removal of catalyst which is withdrawn from the bottom of the thickener via line 20 as a slurry generally containing from 2 to 5 pounds of catalyst per gallon of oil. This catalyst slurry will usually amount to about 200 to 500 bbl./day. The clarified oil amounting to about 800 to 1300 bbl./day is withdrawn from the thickener via line 22, a portion thereof being passed to storage. Another portion of the clarified oil amounting to 500 to 800 bbl./day is passed from line 22 through line 23 back to the bottom of fractionator 14 to provide sufficient oil in combination with the residuum for removal of the catalyst. In this manner the cracked product passed to the fractionator may be fractionated to recover all fractions desirable leaving only a very small quantity of residuum which by itself would be insufficient to carry off the catalyst. The catalyst slurry is withdrawn from the bottom of thickener 19 via line 20. Reslurry oil in an amount ranging from 200 to 1500 bbl./day is introduced to the withdrawn slurry via line 21 to make the slurry more pumpable and more easily carried back to catalyst chamber 10. A suitable oil for this use is a portion of the fresh feed. When desired, all or a portion of the catalyst recovered from thickener 19 may be passed to regeneration chamber 25 via line 24. When such a procedure is carried out it may be desirable to use steam or other gas for carrying the catalyst from the thickener rather than reslurry oil and to strip same with steam prior to regeneration. Catalyst, regenerated by conventional means, is passed from regeneration chamber 25 via lines 26, 20 and 11 back to chamber 10. It is within the scope of my invention to pass the catalyst to a storage bin and when such a procedure is carried out it is again often desirable to use a gas as a carrier for the catalyst. However, if the conditions are such that it is better to use reslurry oil, then the catalyst slurry may be passed to a storage tank equipped with suitable stirring mechanism to maintain the catalyst distributed in the oil.

The operating conditions of the above described process are usually selected to provide a per pass conversion in the range of 45 to 50 per cent, however, depending on the character of the feed and the desired character of the products, the conversion rate may be either above or below this range.

Using a similar charge stock to that discussed in relation to the attached drawing and with the same percentage of conversion in the catalyst chamber but without recycle of clarified residue would necessitate separation of a larger quantity of oil as residue from the fractionator such as in the range of 800 to 1300 bbl./day, whereas with recycle the residue continuously obtained from the cracking chamber, not including the recycled oil, would amount to only 500 to 1000 bbl./day. Thereby a saving of three hundred barrels of oil a day may be made which means a considerable economic saving.

Although this process has been described and exemplified in terms of its preferred modifications, it is understood that various changes may be made without departing from the spirit and scope of the disclosure and of the claims.

I claim:

1. In a fluidized catalytic process for the treatment of hydrocarbons in which the reaction products still contain entrained catalyst, the steps of passing the reaction products to a fractionating column, fractionating said reaction products to recover a maximum quantity of all fractions thereby leaving a minimum quantity of refractory bottoms insufficient to carry catalyst from the bottom of said fractionator, recycling to the fractionator below the entry of the cracked products only sufficient refractory bottoms to carry off the catalyst when combined with refractory bottoms in the column, removing a mixture of catalyst and refractory bottoms from said column, separating said mixture into an oil fraction and a catalyst fraction, and utilizing the oil fraction thus recovered as said sufficient refractory bottoms.

2. A fluidized catalyst process which comprises contacting an oil with a particulate cracking catalyst in such a manner as to maintain the catalyst in a fluidized condition, separating a major portion of the catalyst from the cracked products and returning same to the fluidized bed of catalyst, passing the cracked products containing entrained catalyst to a fractionating column, fractionating said cracked products to recover a maximum quantity of all fractions thereby leaving a minimum quantity of refractory bottoms insufficient to carry catalyst from the bottom of said fractionator, recycling to the fractionator below the entry of the cracked products only sufficient refractory bottoms when combined with refractory bottoms in the column to carry off the catalyst, passing said mixture of refractory bottoms and catalyst to thickening, recovering refractory bottoms from said thickening and passing a portion thereof to the aforesaid recycling step to the fractionator, recovering also from said thickening a slurry of entrained catalyst, mixing said slurry with an additional reslurry oil, and passing the slurry so-formed back to said contacting.

3. A fluidized catalyst process which comprises vaporizing an oil boiling in the range of 400 to 750° F., contacting said oil with a powdered natural cracking catalyst, in such a manner that said catalyst is maintained in a fluidized condition and at a temperature in the range of 600 to 1200° F. and a pressure in the range of atmospheric to 100 p. s. i. g., cracking said oil, separating the major portion of said catalyst from the cracked products within the area of said cracking, passing said cracked products and entrained catalyst to a fractionator, separating said products in the fractionator into a maximum amount of gas, gasoline, light cycle oil and heavy cycle oil, with a minimum amount of heavy residue, passing said heavy cycle oil back to said cracking as a supplement to the feed oil, recycling to the fractionator below the entering cracked products only sufficient heavy residue when combined with heavy residue in the fractionator to carry catalyst from the bottom of said fractionator, passing the heavy residue and the catalyst entrained therein from the fractionator to thickening, recovering a clarified fuel oil residue from said thickening and passing a portion thereof to the aforesaid recycling step, and from thickening passing a slurry of said entrained catalyst comprising from 2 to 5 pounds of catalyst per gallon of oil, along with a portion of fresh feed as reslurry oil to said cracking.

4. A process according to claim 3 wherein at least a portion of said recycled entrained catalyst is regenerated before passing to said cracking.

5. A fluidized catalyst process which comprises vaporizing an oil boiling in the range of 400 to 750° F., contacting said vaporized oil with a powdered natural cracking catalyst in a catalyst to oil weight ratio in the range of 7.0 to 7.5, cracking said oil at a temperature in the range of 900 to 950° F., a pressure in the range of atmospheric to 50 p. s. i. g., and a space velocity of 0.75 to 0.80 weight of oil per weight of catalyst per hour, separating the major portion of said catalyst from the cracked products within the area of said cracking, passing said cracked products and entrained catalyst to a fractionator, separating said products in the fractionator into a maximum amount of gas, gasoline, light cycle oil and heavy cycle oil with a minimum amount of heavy residue, recovering the gas, gasoline, light cycle oil and heavy cycle oil, recycling at least a portion of said heavy cycle oil back to said cracking, recycling to the fractionator below the point of entry of cracked products only sufficient heavy residue to carry catalyst from said fractionator when combined with heavy residue in the bottom of the fractionator, passing said heavy residue containing entrained catalyst from said fractionator to thickening, recovering a clarified oil residue from said thickening and utilizing a portion of same as aforesaid recycle to the fractionator, and from said thickening passing a slurry of entrained catalyst comprising from 2 to 5 pounds of catalyst per gallon of oil along with a portion of fresh feed as reslurry oil to said cracking.

References Cited in the file of this patent

UNITED STATES PATENTS

| Number | Name | Date |
|---|---|---|
| 2,370,816 | Schonberg | Mar. 6, 1945 |
| 2,416,608 | Brackenbury | Feb. 25, 1947 |
| 2,430,015 | Hatton et al. | Nov. 4, 1947 |
| 2,447,149 | Wier | Aug. 17, 1948 |
| 2,449,095 | Wheeler et al. | Sept. 14, 1948 |
| 2,541,635 | Boyer | Feb. 13, 1951 |